(12) United States Patent
Zhang et al.

(10) Patent No.: US 11,989,068 B2
(45) Date of Patent: May 21, 2024

(54) THERMAL AND PERFORMANCE MANAGEMENT

(71) Applicant: INTERNATIONAL BUSINESS MACHINES CORPORATION, Armonk, NY (US)

(72) Inventors: Xin Zhang, Chappaqua, NY (US); Shun Zhang, San Mateo, CA (US); Shaoze Fan, East Newark, NJ (US); Xiaoxiao Guo, Mountain View, CA (US); Chuang Gan, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 120 days.

(21) Appl. No.: 17/852,699

(22) Filed: Jun. 29, 2022

(65) Prior Publication Data

US 2024/0004443 A1 Jan. 4, 2024

(51) Int. Cl.
*G06F 1/26* (2006.01)
*G06F 1/20* (2006.01)
*G06F 1/28* (2006.01)
*G06F 1/3203* (2019.01)
*G06N 20/00* (2019.01)

(52) U.S. Cl.
CPC ............... *G06F 1/26* (2013.01); *G06F 1/206* (2013.01); *G06F 1/28* (2013.01); *G06F 1/3203* (2013.01); *G06N 20/00* (2019.01)

(58) Field of Classification Search
CPC ... G06F 1/206; G06F 1/26; G06F 1/28; G06F 1/3203; G06N 20/00
See application file for complete search history.

(56) References Cited

U.S. PATENT DOCUMENTS

| 10,210,505 | B2 | 2/2019 | Zarakas |
| 10,504,020 | B2 | 12/2019 | Trenholm |
| 10,579,990 | B2 | 3/2020 | Zarakas |
| 10,725,834 | B2 | 7/2020 | Lee |
| 10,761,583 | B2 | 9/2020 | Lee |
| 10,775,863 | B2 | 9/2020 | Culbert |

(Continued)

FOREIGN PATENT DOCUMENTS

WO WO-2019227273 A1 * 12/2019 ............... G06N 3/04

OTHER PUBLICATIONS

US 11,249,467 B2, 02/2022, Cella (withdrawn)

(Continued)

*Primary Examiner* — Glenn A. Auve
(74) *Attorney, Agent, or Firm* — Stosch Sabo

(57) ABSTRACT

Described aspects include a system for optimizing performance of a functional circuit unit, a method of optimizing performance of a functional circuit unit, and a computer program product. In one embodiment, the system may include a functional circuit unit having an associated cooling device and power converter, one or more sensors for the functional circuit unit, the one or more sensors including a power sensor and a temperature sensor, and a first machine learning model. The first machine learning model may be adapted to receive temperature data and power data from the one or more sensors, and to generate control signals for the cooling device and the power converter to optimize performance of the functional circuit unit.

14 Claims, 10 Drawing Sheets

(56) References Cited

U.S. PATENT DOCUMENTS

| | | | |
|---|---|---|---|
| 10,831,252 | B2 | 11/2020 | Lee |
| 11,243,522 | B2 | 2/2022 | Cella |
| 2004/0225902 | A1* | 11/2004 | Cesare ................. G06F 1/3203 |
| | | | 713/300 |
| 2016/0349812 | A1 | 12/2016 | Goh |
| 2019/0042979 | A1 | 2/2019 | Devulapalli |
| 2020/0195141 | A1* | 6/2020 | Schwabe ................. H03K 7/08 |
| 2021/0028983 | A1 | 1/2021 | Balakrishnan |
| 2021/0181830 | A1 | 6/2021 | Lee |
| 2021/0201130 | A1 | 7/2021 | Lee |
| 2021/0405727 | A1 | 12/2021 | Singh |
| 2022/0244767 | A1* | 8/2022 | Sodani ................... G06F 1/324 |

OTHER PUBLICATIONS

Broyles et al., "IBM EnergyScale for POWER8 Processor-Based Systems", 58 pps., Nov. 2015, <https://www.ibm.com/downloads/cas/JB3VDKZQ>.

"Reinforcement Learning as a Basis for Optimization of Operating Systems", An IP.com Prior Art Database Technical Disclosure, IP.com No. IPCOM000256512D, IP.com Electronic Publication Date: Dec. 5, 2018, 9 pps.

"System and Method to Optimize ML Models Via Content Generalization", An IP.com Prior Art Database Technical Disclosure, IP.com No. IPCOM000264446D, IP.com Electronic Publication Date: Dec. 18, 2020, 3 pps.

"Using Energy Consumption Metrics to Make Machine Learning Models Energy Optimal", An IP.com Prior Art Database Technical Disclosure, IP.com No. IPCOM000254863D, IP.com Electronic Publication Date: Aug. 9, 2018, 10 pps.

Binder, "Development of Next-Generation Vertical Gan Devices for High-Power Density Electric Drivetrain", Jun. 22, 2021, 19 pps., Project ID: ELT210, Sandia National Laboratories.

Broyles et al., "IBM EnergyScale for POWER9 Processor-Based Systems", 53 pps., Feb. 2021, <https://www.ibm.com/downloads/cas/6GZMODN3>.

Fan et al., "From Specification to Topology: Automatic Power Converter Design via Reinforcement Learning", In International Conference on Computer Aided Design (ICCAD), 9 pps., 2021.

Shizuka et al., "Application of Thermal Network Model to Transient Thermal Analysis of Power Electronic Package Substrate", Hindawi Publishing Corporation, Active and Passive Electronic Components, vol. 2011, Article ID 823654, 8 pages, doi: 10.1155/2011/823654, Research Article.

Lazic, et al., "Data center cooling using model-predictive control", Advances in Neural Information Processing Systems 31 (2018), 10 pps.

Li et al., "Transforming cooling optimization for green data center via deep reinforcement learning", IEEE transactions on cybernetics 50.5 (2019): 2002-2013.

U.S. Appl. No. 17/846,115, filed Jun. 22, 2022. A Copy of This Reference is Not Attached Because It is Readily Available To the Examiner.

Patel, "A Practical Approach for Predicting Power in a Small Scale Off Grid Photovoltaic System Using Machine Learning Algorithms", Hindawi International Journal of Photoenergy, vol. 2022, Article ID 9194537, 21 pages https://doi.org/10.1155/2022/9194537.

Patent Cooperation Treaty International Search Report and Written Opinion, Date of Mailing Oct. 5, 2023, International Application No. PCT EP2023/066458, IBM Patent Record P202106154PCT01, 15 pages.

* cited by examiner

THERMAL AND PERFORMANCE MANAGEMENT

BACKGROUND

The present disclosure relates to thermal management; and more specifically, to thermal and performance management of data processing systems (DPS).

The development of the EDVAC system in 1948 is often cited as the beginning of the computer era. Since that time, DPS have evolved into extremely complicated devices. Today's DPS typically include a combination of sophisticated hardware and software components, application programs, operating systems, processors, buses, memory, input/output devices, and so on. As advances in semiconductor processing and computer architecture push performance higher and higher, even more advanced computer software has evolved to take advantage of the relatively higher performance of those capabilities, resulting in DPS today that are more powerful than just a few years ago.

These increased capabilities, however, have generally led to increased power consumption. This effect, in turn, may be magnified by compute-intensive applications of these computing systems, such as machine learning workloads. Determining how to fully utilize the computing performance of computing systems, while maintain thermal and power budgets, has become a significant challenge to future datacenters and cloud servers. Conventional solutions use rule-based or table-lookup methods for power control.

SUMMARY

According to embodiments of the present disclosure, a system for optimizing performance of a functional circuit unit, the system including a functional circuit unit having an associated cooling device and power converter, one or more sensors for the functional circuit unit, the one or more sensors including a power sensor and a temperature sensor, and a first machine learning model. The first machine learning model may be adapted to receive temperature data and power data from the one or more sensors, and generate control signals for the cooling device and the power converter to optimize performance of the functional circuit unit.

According to embodiments of the present disclosure, a method of optimizing performance of a functional circuit unit, comprising generating, by one or more sensors associated with a functional circuit unit having an associated cooling device and power converter, temperature data and power data. The method may further comprise generating, by a first machine learning model, control signals for the cooling device and the power converter to optimize performance of the functional circuit unit. In some embodiments, the method may further comprise predicting, by a second machine learning model, a state representation of the functional circuit unit based at least in part on the temperature data and power data, and generating, by the second machine learning model, a vector that captures the predicted state representation.

According to embodiments of the present disclosure, a computer program product for optimizing performance of a functional circuit unit, the computer program product comprising a computer readable storage medium having program instructions embodied therewith. The program instructions may be executable by a computer to perform a method comprising generating, by a first machine learning model, control signals for the cooling device and the power converter to optimize performance of the functional circuit unit. In some embodiments, the method may further comprise predicting, by a second machine learning model, a state representation of the functional circuit unit based at least in part on the temperature data and power data, and generating, by the second machine learning model, a vector that captures the predicted state representation.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
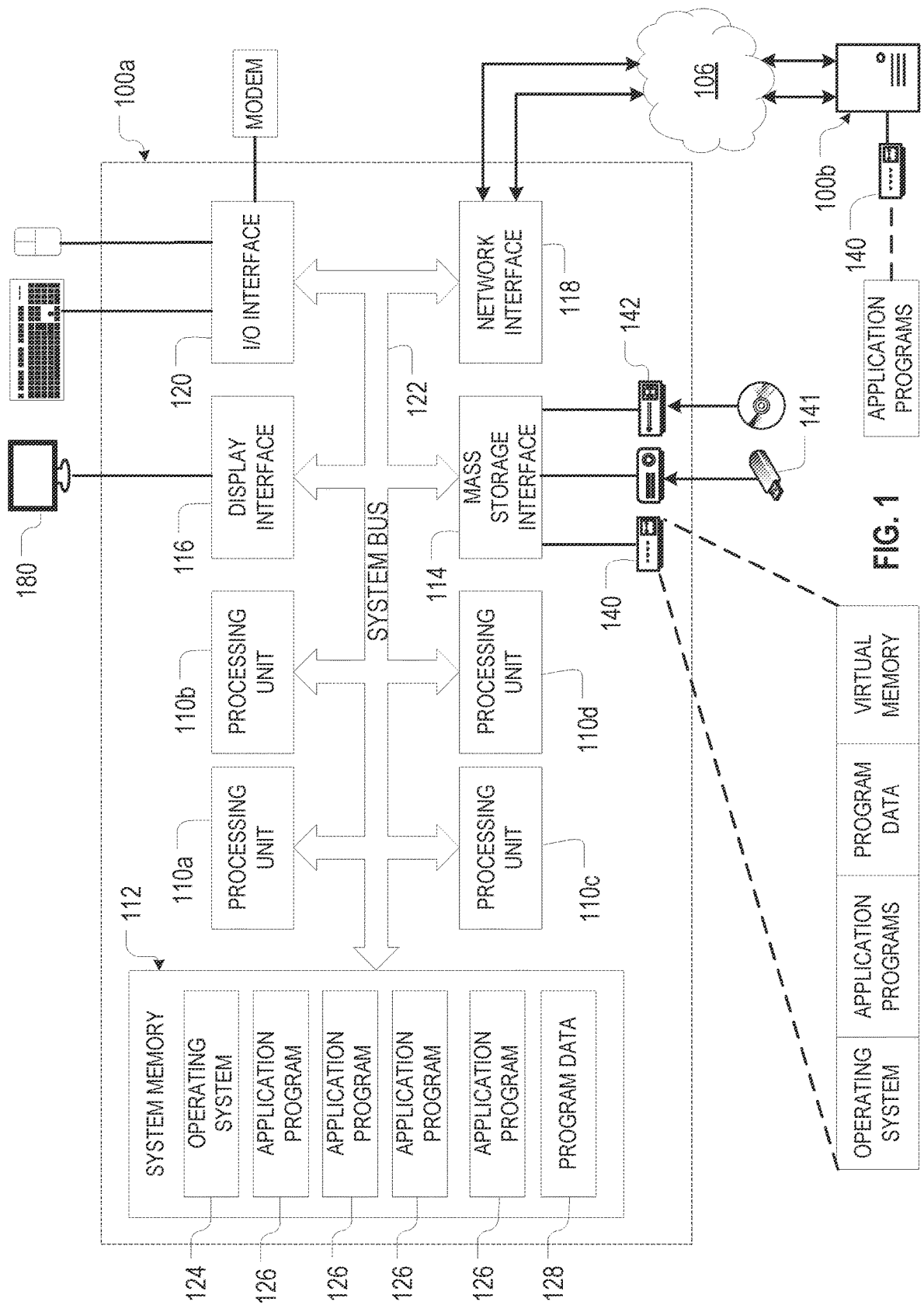
FIG. 1 illustrates one embodiment of a data processing system, consistent with some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to thermal management more particular aspects relate to thermal and performance management of data processing systems (DPS). While the present disclosure is not necessarily limited to such applications, various aspects of the disclosure may be appreciated through a discussion of various examples using this context.

Aspects of the disclosure include data-driven methods and systems to optimally control the thermal, power, and performance of data processing systems, such as electronic cards/chips (including, without limitation, microprocessors, accelerators, and coprocessors), pervasive computing devices, personal computers, and commercial data servers. These accelerators, in turn, may comprise a graphical processing unit (GPU) and/or a machine learning accelerator. Some embodiments may include a device control engine that uses reinforcement learning systems to optimize the thermal, power and performance management of an associated DPS. The reinforcement learning systems in some embodiments may utilize offline training and live training to achieve substantially optimal thermal and performance management.

Advantageously, most of the training of some embodiments can be done offline using a simulator. These embodiments may optionally fine-tune the reinforcement learning policy in an online phase, which requires minimal computation. Moreover, in the online evaluation phase, applying the reinforcement learning-based control policy may be made efficient by only utilizing a forward pass of the machine learning model(s). For example, forward-only systems may be more computationally efficient when computed on graphics processing units (GPUs) and/or may avoid computationally expensive back propagation processes during training.

Data Processing System (DPS)

FIG. 1 illustrates one embodiment of a data processing system (DPS) 100a, 100b (herein generically referred to as a DPS 100), consistent with some embodiments. FIG. 1 only depicts the representative major components of the DPS 100, and those individual components may have greater complexity than represented in FIG. 1. In some embodiments, the DPS 100 may be implemented as a personal computer; server computer; portable computer, such as a laptop or notebook computer, PDA (Personal Digital Assistant), tablet computer, or smartphone; processors embedded into larger devices, such as an automobile, airplane, teleconferencing system, appliance; smart devices; or any other appropriate type of electronic device. Moreover, components other than or in addition to those shown in FIG. 1 may be present, and the number, type, and configuration of such components may vary.

The DPS 100 in FIG. 1 may comprise a plurality of processing units 110a-110d (generically, processor 110 or CPU 110) that may be connected to a main memory 112, a mass storage interface 114, a terminal/display interface 116, a network interface 118, and an input/output ("I/O") interface 120 by a system bus 122. The mass storage interface 114 in this embodiment may connect the system bus 122 to one or more mass storage devices, such as a direct access storage device 140, a USB drive 141, and/or a readable/writable optical disk drive 142. The network interface 118 may allow the DPS 100a to communicate with other DPS 100b over a network 106. The main memory 112 may contain an operating system 124, a plurality of application programs 126, and program data 128.

The DPS 100 embodiment in FIG. 1 may be a general-purpose computing device. In these embodiments, the processors 110 may be any device capable of executing program instructions stored in the main memory 112, and may themselves be constructed from one or more microprocessors and/or integrated circuits. In some embodiments, the DPS 100 may contain multiple processors and/or processing cores, as is typical of larger, more capable computer systems; however, in other embodiments, the DPS 100 may only comprise a single processor system and/or a single processor designed to emulate a multiprocessor system. Further, the processor(s) 110 may be implemented using a number of heterogeneous data processing systems in which a main processor 110 is present with secondary processors on a single chip. As another illustrative example, the processor(s) 110 may be a symmetric multiprocessor system containing multiple processors 110 of the same type.

When the DPS 100 starts up, the associated processor(s) 110 may initially execute program instructions that make up the operating system 124. The operating system 124, in turn, may manage the physical and logical resources of the DPS 100. These resources may include the main memory 112, the mass storage interface 114, the terminal/display interface 116, the network interface 118, and the system bus 122. As with the processor(s) 110, some DPS 100 embodiments may utilize multiple system interfaces 114, 116, 118, 120, and buses 122, which in turn, may each include their own separate, fully programmed microprocessors.

Instructions for the operating system 124 and/or application programs 126 (generically, "program code," "computer usable program code," or "computer readable program code") may be initially located in the mass storage devices, which are in communication with the processor(s) 110 through the system bus 122. The program code in the different embodiments may be embodied on different physical or tangible computer-readable media, such as the memory 112 or the mass storage devices. In the illustrative example in FIG. 1, the instructions may be stored in a functional form of persistent storage on the direct access storage device 140. These instructions may then be loaded into the main memory 112 for execution by the processor(s) 110. However, the program code may also be located in a functional form on the computer-readable media, such as the direct access storage device 140 or the readable/writable optical disk drive 142, that is selectively removable in some embodiments. It may be loaded onto or transferred to the DPS 100 for execution by the processor(s) 110.

With continuing reference to FIG. 1, the system bus 122 may be any device that facilitates communication between and among the processor(s) 110; the main memory 112; and the interface(s) 114, 116, 118, 120. Moreover, although the system bus 122 in this embodiment is a relatively simple, single bus structure that provides a direct communication path among the system bus 122, other bus structures are consistent with the present disclosure, including without limitation, point-to-point links in hierarchical, star or web configurations, multiple hierarchical buses, parallel and redundant paths, etc.

The main memory 112 and the mass storage device(s) 140 may work cooperatively to store the operating system 124, the application programs 126, and the program data 128. In some embodiments, the main memory 112 may be a random-access semiconductor memory device ("RAM") capable of storing data and program instructions. Although FIG. 1 conceptually depicts the main memory 112 as a single monolithic entity, the main memory 112 in some embodiments may be a more complex arrangement, such as a hierarchy of caches and other memory devices. For example, the main memory 112 may exist in multiple levels of caches, and these caches may be further divided by function, such that one cache holds instructions while another cache holds non-instruction data that is used by the processor(s) 110. The main memory 112 may be further distributed and associated with a different processor(s) 110 or sets of the processor(s) 110, as is known in any of various so-called non-uniform memory access (NUMA) computer architectures. Moreover, some embodiments may utilize virtual addressing mechanisms that allow the DPS 100 to behave as if it has access to a large, single storage entity instead of access to multiple, smaller storage entities (such as the main memory 112 and the mass storage device 140).

Although the operating system 124, the application programs 126, and the program data 128 are illustrated in FIG. 1 as being contained within the main memory 112 of DPS 100a, some or all of them may be physically located on a different computer system (e.g., DPS 100b) and may be accessed remotely, e.g., via the network 106, in some embodiments. Moreover, the operating system 124, the application programs 126, and the program data 128 are not necessarily all completely contained in the same physical DPS 100a at the same time, and may even reside in the physical or virtual memory of other DPS 100b.

The system interfaces 114, 116, 118, 120 in some embodiments may support communication with a variety of storage and I/O devices. The mass storage interface 114 may support the attachment of one or more mass storage devices 140, which may include rotating magnetic disk drive storage devices, solid-state storage devices (SSD) that uses integrated circuit assemblies as memory to store data persistently, typically using flash memory or a combination of the two. Additionally, the mass storage devices 140 may also comprise other devices and assemblies, including arrays of disk drives configured to appear as a single large storage device to a host (commonly called RAID arrays) and/or archival storage media, such as hard disk drives, tape (e.g., mini-DV), writable compact disks (e.g., CD-R and CD-RW), digital versatile disks (e.g., DVD, DVD-R, DVD+R, DVD+RW, DVD-RAM), holography storage systems, blue laser disks, IBM Millipede devices, and the like. The I/O interface 120 may support attachment of one or more I/O devices, such as a keyboard, mouse, modem, or printer (not shown)

The terminal/display interface 116 may be used to directly connect one or more displays 180 to the DPS 100. These displays 180 may be non-intelligent (i.e., dumb) terminals, such as an LED monitor, or may themselves be fully programmable workstations that allow IT administrators and users to communicate with the DPS 100. Note, however, that while the display interface 116 may be provided to support communication with one or more displays 180, the DPS 100 does not necessarily require a display 180 because all needed interaction with users and other processes may occur via the network 106.

The network 106 may be any suitable network or combination of networks and may support any appropriate protocol suitable for communication of data and/or code to/from multiple DPS 100. Accordingly, the network interfaces 118 may be any device that facilitates such communication, regardless of whether the network connection is made using present-day analog and/or digital techniques or via some networking mechanism of the future. Suitable networks 106 include, but are not limited to, networks implemented using one or more of the "InfiniBand" or IEEE (Institute of Electrical and Electronics Engineers) 802.3x "Ethernet" specifications; cellular transmission networks; wireless networks implemented one of the IEEE 802.11x, IEEE 802.16, General Packet Radio Service ("GPRS"), FRS (Family Radio Service), or Bluetooth specifications; Ultra-Wide Band ("UWB") technology, such as that described in FCC 02-48; or the like. Those skilled in the art will appreciate that many different network and transport protocols may be used to implement the network 106. The Transmission Control Protocol/Internet Protocol ("TCP/IP") suite contains a suitable network and transport protocols.

Cloud Computing

Figure 2:
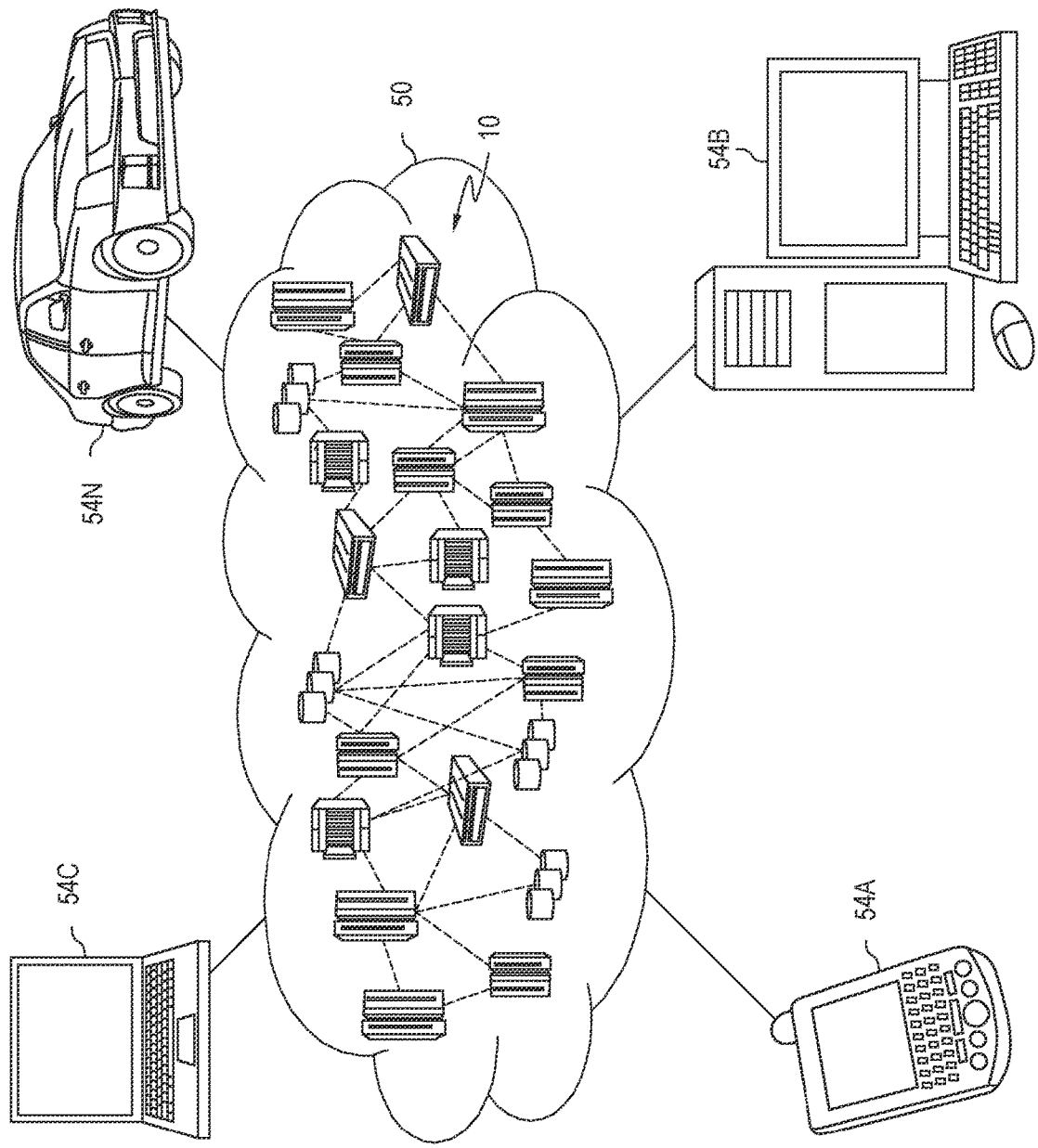
FIG. 2 illustrates one embodiment of a cloud environment comprising one or more DPS 100, consistent with some embodiments.

FIG. 2 illustrates one embodiment of a cloud environment comprising one or more DPS 100. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
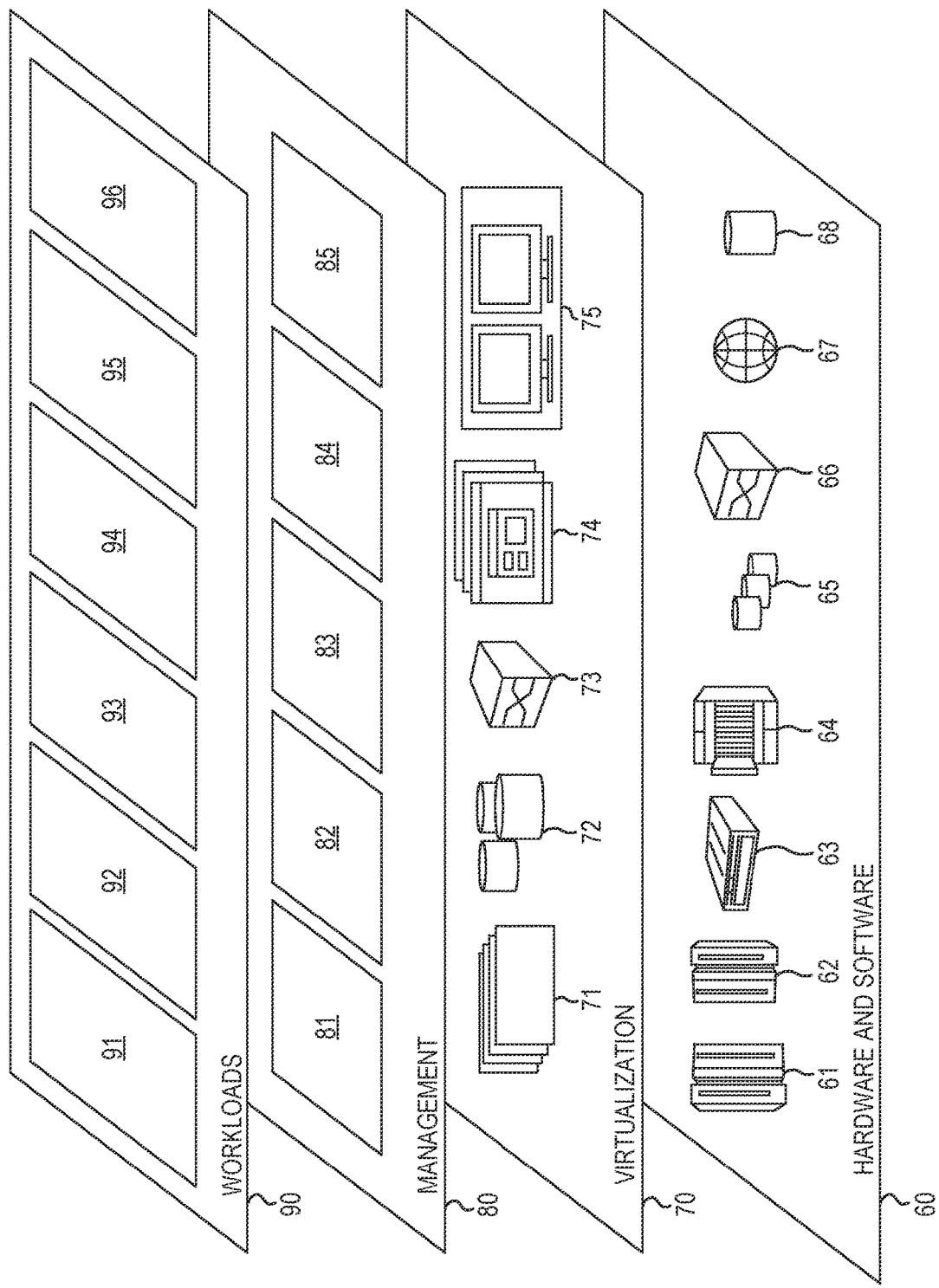
FIG. 3 shows a set of functional abstraction layers provided by a cloud computing environment, consistent with some embodiments.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and performance management engine 96.

Performance Management Engine

Figure 4A:
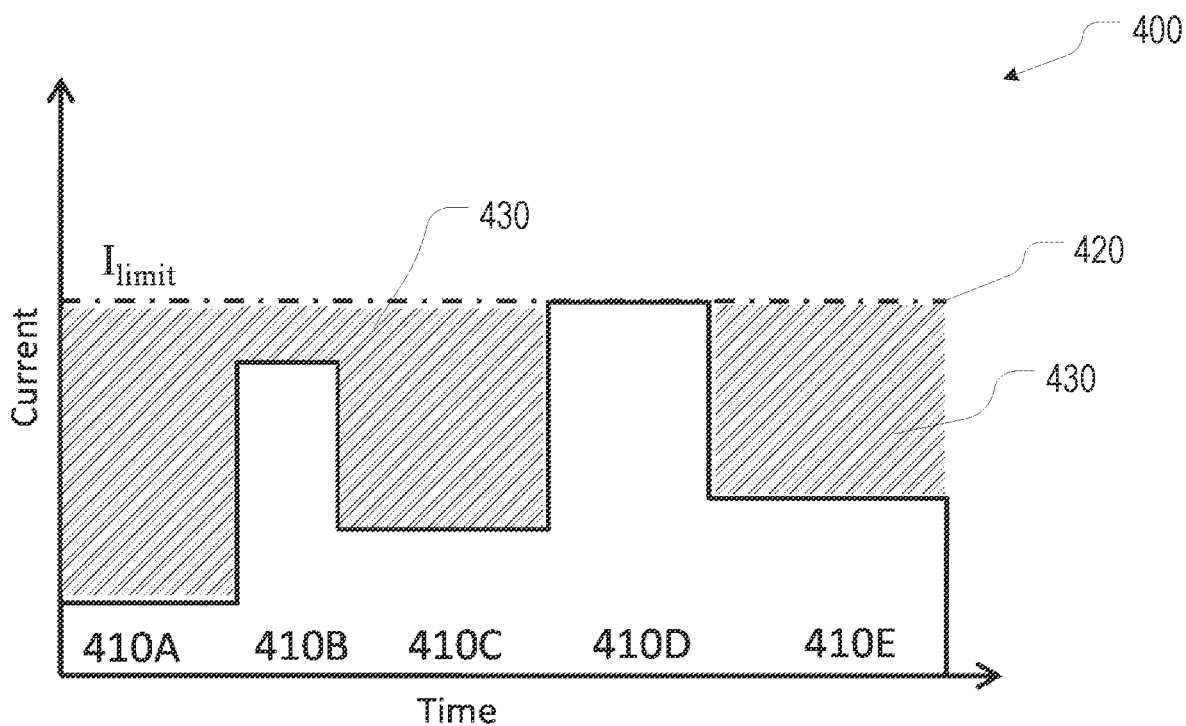
FIG. 4A (Prior Art) is a graph of an illustrative example of the current flow for a series of jobs submitted to a conventional processor.

FIG. 4A (Prior Art) is a graph 400 (Current v. Time) of an illustrative example of the current flow for a series of jobs 410A-410E submitted to a conventional processor over time. This series of jobs 410A-410E has a time dependent pattern due to the nature of the tasks and applications that the processor is executing. FIG. 4A also shows a current or power design limit $I_{limit}$ 420 for the processor, which defines a maximum current that should be consumed by that processor to, e.g., prevent permanent damage. In FIG. 4A, some of the jobs 410A-410E may consume less than that maximum current/power 420, resulting in unused/wasted current capacity 430. In these conventional designs, cooling and temperature sensing are separate from processor power control. Thus, effective chip processing power is dependent on the temperature of the processor chip.

Figure 4B:
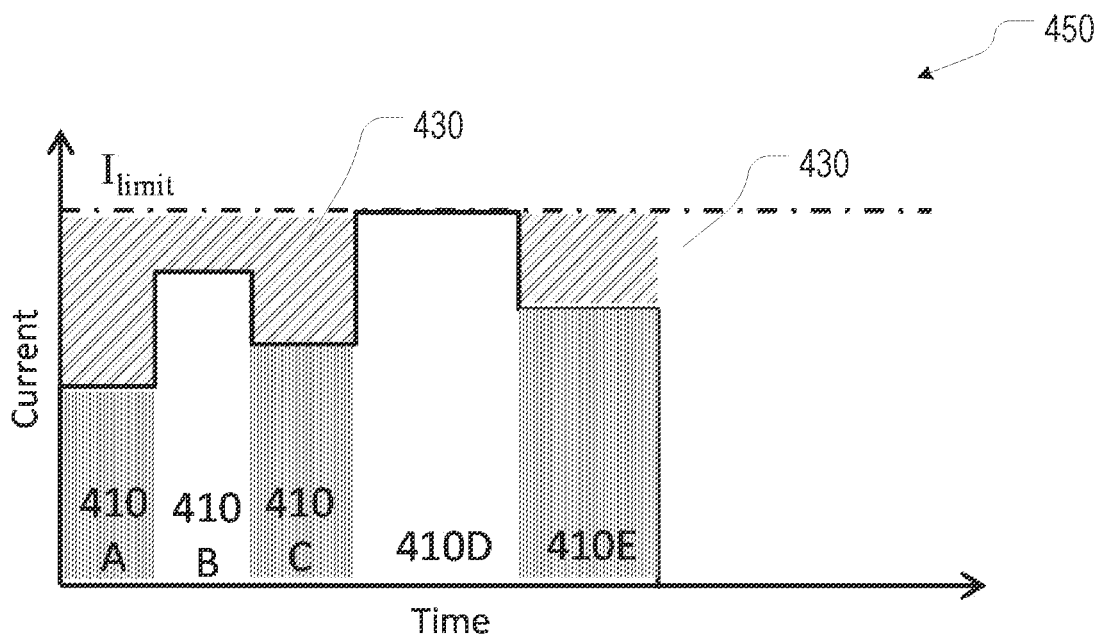
FIG. 4B is a graph of an illustrative example of for the execution of the current flow for same series of jobs shown in FIG. 4A consistent with some embodiments of this disclosure.

FIG. 4B is a graph 450 (Current v. Time) of an illustrative example for the same series of jobs 410A-410E consistent with some embodiments of this disclosure. In FIG. 4B, an operating frequency of the processor has been increased during processing of some of the jobs, e.g., 410A, 410C, 410E during which unused capacity 430 was available. This increased frequency may enable those jobs to run faster (e.g., compare the horizontal time (T) axis for job 410A in FIG. 4A with the time axis (T) for job 410A in FIG. 4B), but may also cause them consume additional current (e.g., compare the vertical current axis (I) for job 410A in FIG. 4A with the current axis (I) in FIG. 4B). In some applications, a voltage supplied to the processor may also be increased during jobs 410A, 410C, 410E, also causing them to consume additional power, in addition to that caused by the increase in frequency.

Figure 5:
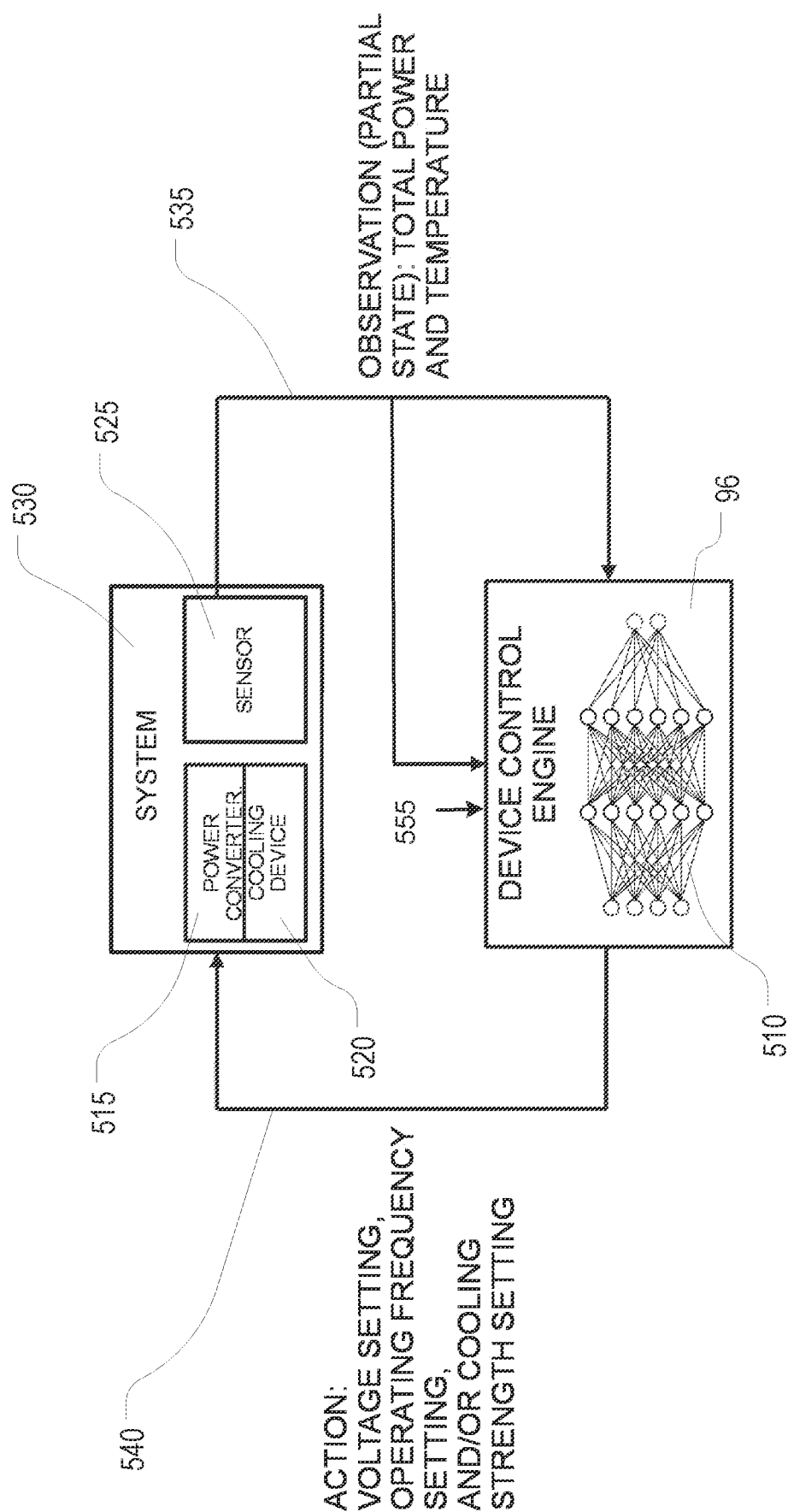
FIG. 5 is a high level system diagram of a performance management engine for one or more DPS, consistent with some embodiments.

FIG. 5 is a high level system diagram 500 of a performance management engine 96 for one or more DPS 100, consistent with some embodiments. The performance management engine 96 may include a system control engine 510 communicatively coupled to a power converter 515, a cooling device 520, and one or more sensors 525 in a managed system 530. The system control engine 510 may receive as input one or more measurements 535 made by the sensors 525 and prespecified targets 555 for those measurements, including a total power use by the managed system 530 and a temperature of the managed system 530. In some embodiments, these sensors 525 may represent partial states of the managed system 530, e.g., a plurality of simultaneous temperature readings representing a current temperature at a plurality of different locations within the system and/or on a card, processor, etc. The system control engine 510 may calculate a plurality of output signals 540, which may encode actions such as: setting a voltage and/or an operating frequency for the managed system 530. The encoded actions may also include a cooling strength setting in some embodiments. Additionally or alternatively, the system control engine 510 in some embodiments may receive as input a reward input, such as a gradient (e.g., a difference between an observed temperature and/or power usage and a specified/target temperature and/or power usage), the reward function described in more detail below, or the like (not shown).

Figure 6:
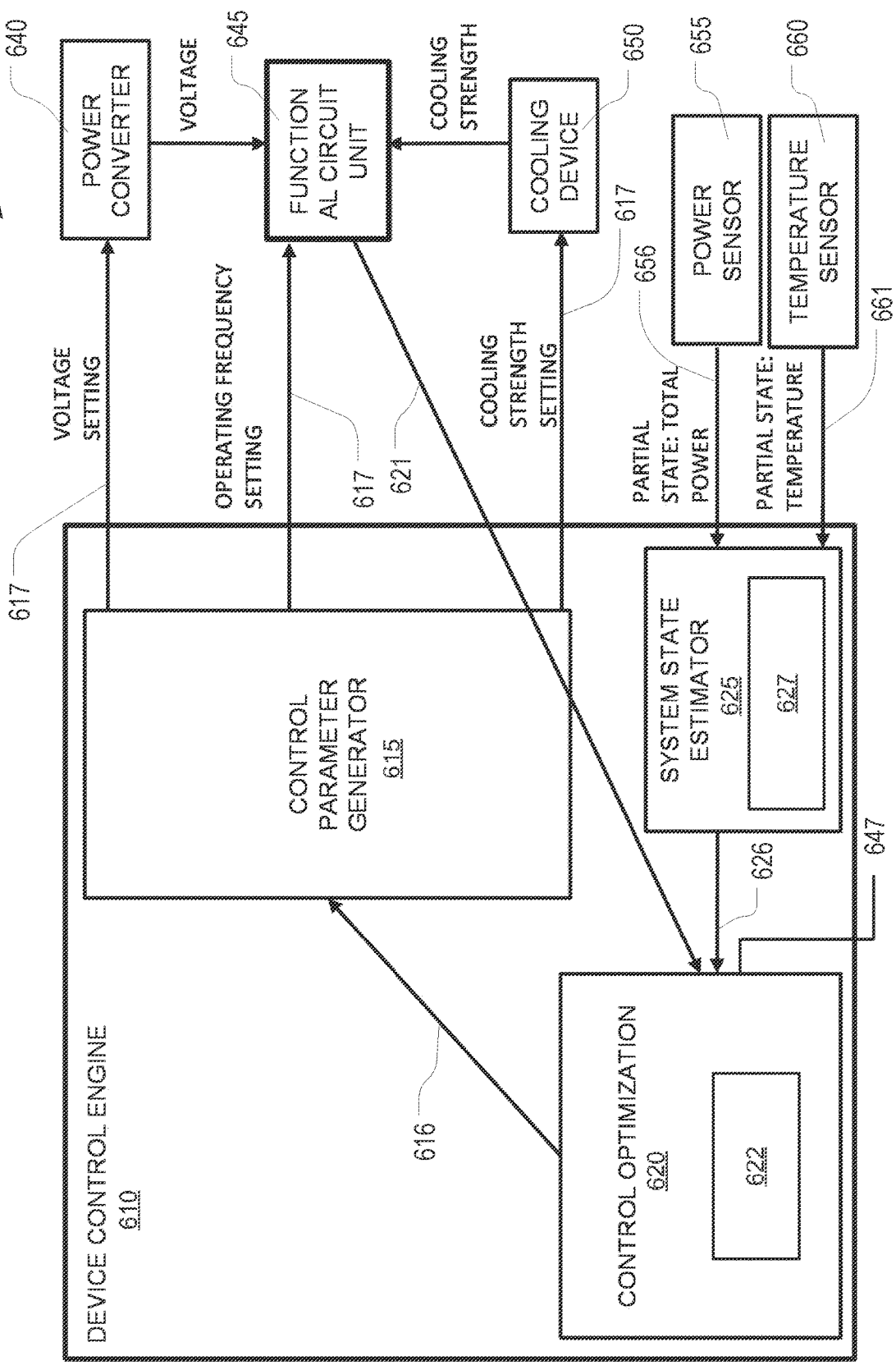
FIG. 6 is a system diagram of the system control engine, consistent with some embodiments.

FIG. 6 is a system diagram of the system control engine 510, consistent with some embodiments. The system control engine 510 embodiment in FIG. 6 comprises a control parameter generator 615, control optimization 620, and a system state estimator 625. The control parameter generator 615 may be communicatively coupled to a power generator 640, a functional circuit unit 645, and a cooling device 650. The system state estimator 625 may be communicatively coupled to one or more power sensors 655 and one or more temperature sensors 660.

In operation, the system state estimator 625 may receive a measurement of the total power 656 being used by the DPS 100 and partial state measurement(s) of a current temperature(s) 661 of the DPS 100 (e.g., at one or more locations). The temperature data 661 and the power data 656 may be concatenated together with performance data 621 from the functional circuit unit 645. The system state estimator 625 may provide these inputs to a first trained machine learning (ML) model 627, which may use deep learning to predict state information 626 for the one or more DPS 100 under its control. This state information 626 may be provided as a vector to control optimization 620. Alternatively, this state information 626 may be provided as a vector that maps the predicted performance, voltage, and temperature. The control optimization 620, in turn, may use a second trained ML model 622 to calculate optimized control parameters for the DPS 100. The second trained machine learning model 622 may use deep reinforcement learning, which may utilize a performance reward function. The reward function may comprise a difference between the state information 626 and one or more specified target values 647 for each state, e.g., the maximum safe temperature for the functional circuit unit, the maximum frequency at with it may operate, etc. Additionally or alternatively, control optimization 620 may be implemented by a rule-based method (i.e., a decision tree).

The control optimization 620 may output one or more control parameters 616 (e.g., power up by X watts, power down by Y watts, temperature down, etc.) to the control parameter generator 615, which may use those controls signals to generate one or more specific control actions 617 (e.g., a voltage increase action, a voltage decrease action, a frequency setting action, a cooling strength action, etc.) These control actions 617 may directly cause the power generator 640, the functional circuit unit 645, and/or the cooling device 650 to change their current operational state.

Figure 7A:
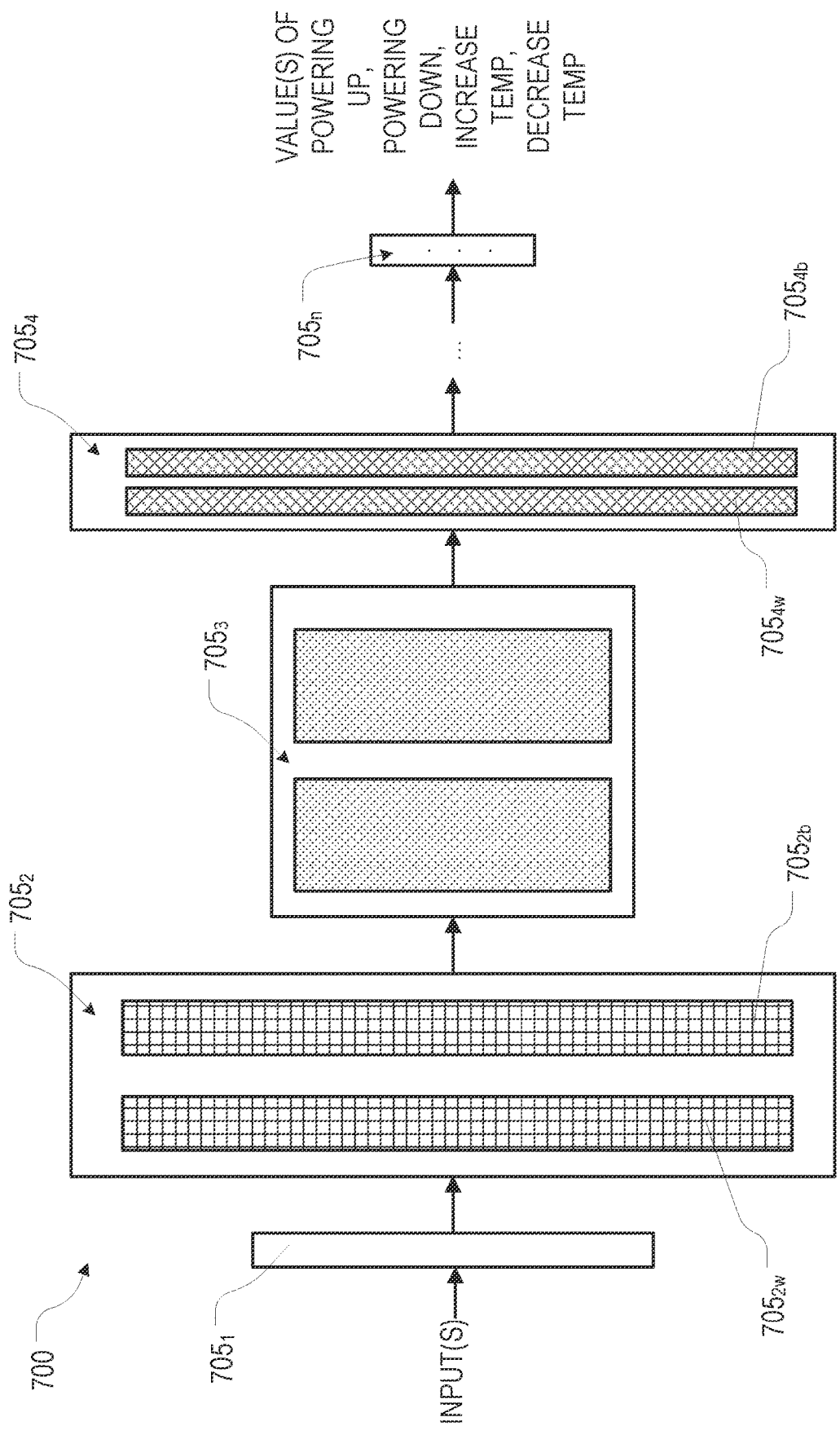
FIG. 7A illustrates an example ML model suitable for use as the first trained ML model or the second trained ML model, consistent with some embodiments.

FIG. 7A illustrates an example ML model 700 suitable for use as the first trained ML model 627 or the second trained ML model 622, consistent with some embodiments. As an illustrative example, the first trained ML model 627 may use deep learning to learn a state representation. Input to this ML model 627 may include an average or the concatenation of the power 656 and temperature 661 signals for a plurality ("N") of past time-steps. An output of this ML module 627 may include the state information 626, which may comprise a vector that captures useful information in the input. Control optimization 620 may use deep reinforcement learning to learn the optimal control based on that state information 626. The actions may be adjustments in power, temperature, etc.

The ML models 622, 627 may be any software system that recognizes patterns. In some embodiments, the ML models 622, 627 may comprise a plurality of artificial neurons interconnected through connection points called synapses or gates. Each synapse may encode a strength of the connection between the output of one neuron and the input of another. The output of each neuron, in turn, may be determined by the aggregate input received from other neurons that are connected to it, and thus by the outputs of these "upstream" connected neurons and the strength of the connections as determined by the synaptic weights.

The ML models may be trained to solve a specific problem (e.g., estimating the state information 626 from the total power 656 and temperature 661 inputs) by adjusting the weights of the synapses such that a particular class of inputs produce a desired output. This weight adjustment procedure in these embodiments is known as "learning." Ideally, these adjustments lead to a pattern of synaptic weights that, during the learning process, converge toward an optimal solution for the given problem based on some cost function. In some embodiments, the artificial neurons may be organized into layers. The ML models 622, 627 in some embodiments may comprise a deep learning algorithm, such as deep Q-learning, policy gradient, etc.

Some embodiments may advantageously utilize a deep learning algorithm adapted to recognize temporal dependencies in the input data, such as a Long Short-Term Memory (LSTM) network and transformer neural network. That is, for purposes of explanation, if the workload or workload for which a particular DPS 100 is normally used exhibit a particular pattern, the system state estimator 625 may learn to recognize and/or anticipate that pattern and the control optimizer 620 may learn to anticipate a power strategy optimized for that anticipated pattern. Thus, in the example in FIGS. 4A-4B, some embodiments may recognize/anticipate that job 410D is frequently dispatched after jobs 410A, 410B, and 410C, and that the anticipated job 410D will consume considerable power. The control optimizer 620 may then issue an anticipatory cooling strength action to the cooling device 650 so that it may begin ramping up its capacity ahead of the actual need for that capacity by the DPS 100. The later embodiments may be desirable because they may recognize relatively longer range temporal dependencies, which may help address vanishing gradient problems.

In FIG. 7A, the ML model 700 comprises a plurality of layers $705_1$-$705_n$. Each of the layers comprises weights $705_{1w}$-$705_{nw}$ and biases $705_{1b}$-$705_{nb}$ (only some labeled for clarity). The layer $705_1$ that receives external data is the input layer. The layer $705_n$ that produces the ultimate result is the output layer. Some embodiments include a plurality of hidden layers $705_2$-$705_{n-1}$ between the input and output layers, and commonly hundreds of such hidden layers. Some of the hidden layers $705_2$-$705_{n-1}$ may have different sizes, organizations, and purposes than other hidden layers $705_2$-$705_{n-1}$. For example, some of the hidden layers in the ML model may be convolution layers, while other hidden layers may be fully connected layers, deconvolution layers, or recurrent layers.

Figure 7B:
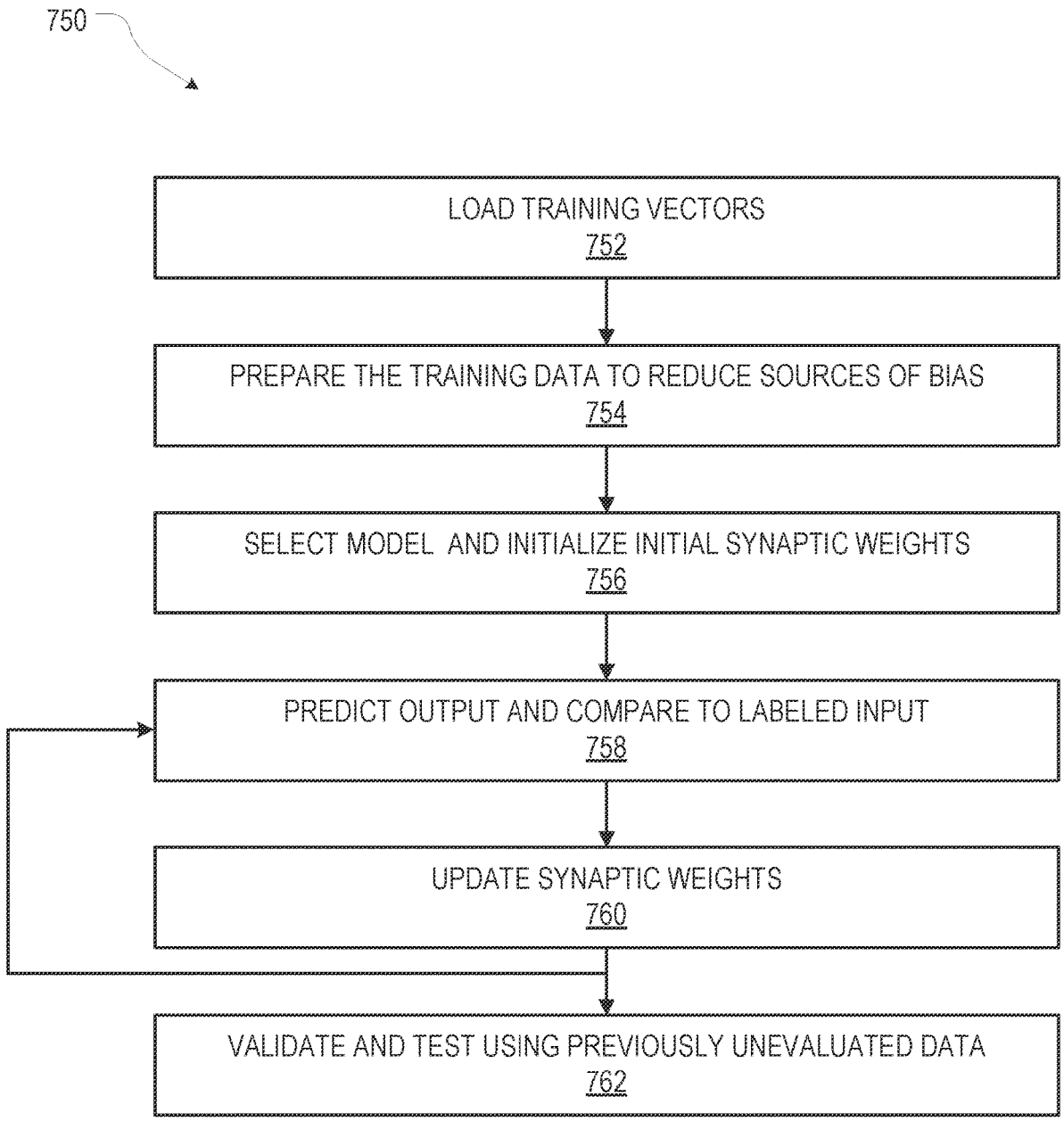
FIG. 7B depicts one embodiment of a ML model training method, consistent with some embodiments.

Referring now to FIG. 7B, one embodiment of a ML model training method 750 is depicted, consistent with some embodiments. At operation 752, the system receives and loads training data. In this example, the input dataset may include previous measurements of total power 656 and temperature 661 at a plurality of time-steps, together with timestamped the performance metrics 621 generated by the functional circuit unit 645. At operation 754, the training data is prepared to reduce sources of bias, typically including de-duplication, normalization, and order randomization. At operation 756, a model is selected for training and the initial synaptic weights are initialized (e.g., randomized). At operation 758, the selected model is used to predict an output using the input data element, and that prediction is compared to the corresponding target data. A reward function, such as a gradient (e.g., difference between the predicted value and the target value) or the reward function described in more detail below, may then be used at operation 760 to update the synaptic weights. This process repeats, with each iteration updating the weights, until the training data is exhausted, or the model reaches an acceptable level of accuracy and/or precision. At operation 762, the resulting model may optionally be compared to previously unevaluated data to validate and test its performance.

In some embodiments, the reward function may be a function of the voltage and the temperature of the functional circuit unit 645 instead of a simple gradient. For example, in some embodiments, the reward function may be the Tera Operations Per Second per Watt (TOPS/W) when the temperature is below a threshold. When the temperature is above the threshold, the reward may be close to 0. As an example:

$$\text{reward}(tops/w, \text{temperature}) = TOPS/W * thres(\text{temperature})$$

where $thres$ is the sigmoid function: $thres(temp) = \dfrac{1}{1 + e^{-(temp - temp_{thres})}}$ and $temp_{thres}$ is the specified temperature 647.

Figure 8:
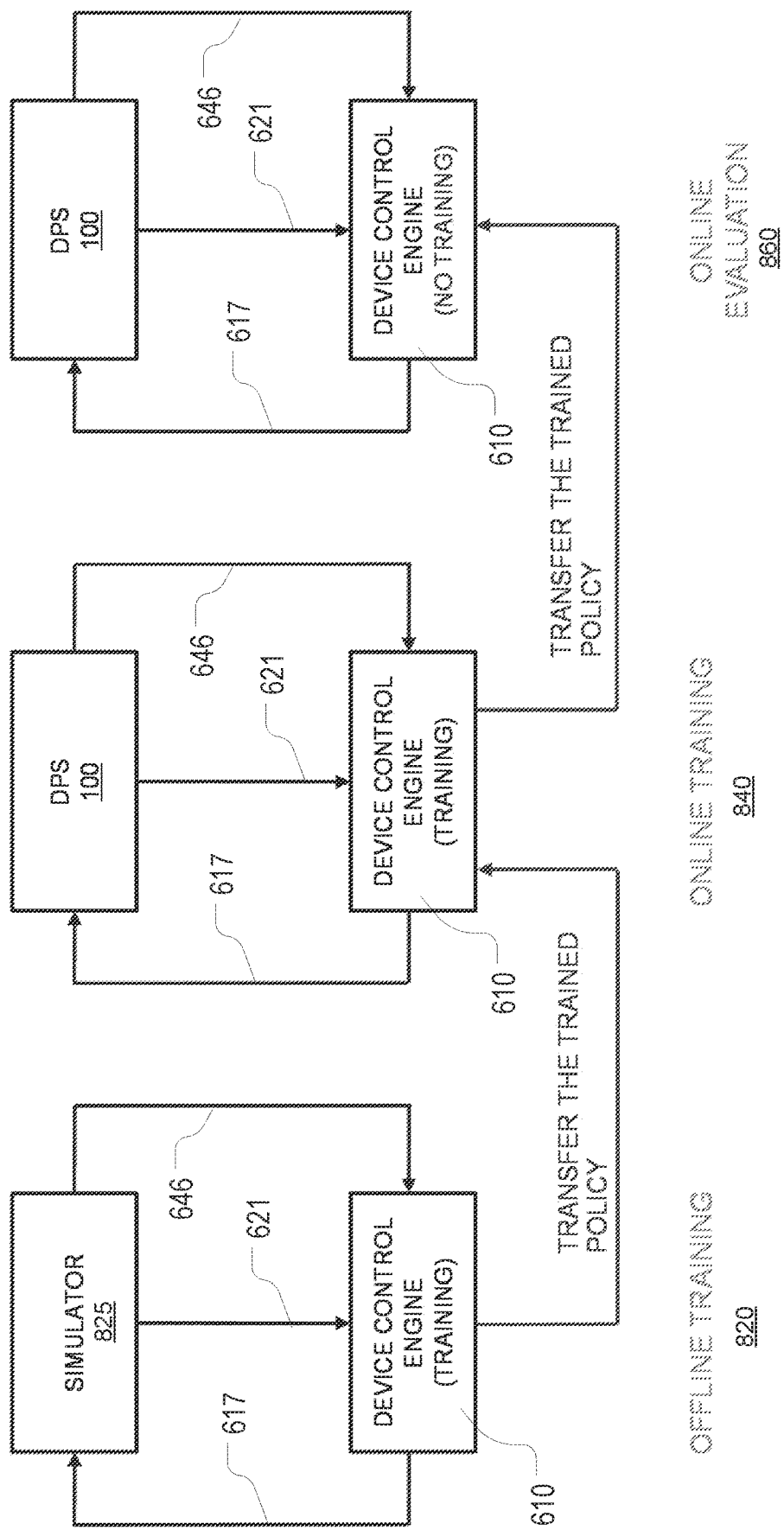
FIG. 8 is a high level flow chart illustrating one method of operating a device control engine, consistent with some embodiments.

FIG. 8 is a high level flow chart illustrating one method 800 of operating a device control engine 610, consistent with some embodiments. Method 800 may comprise three phases: an offline training phase 820, an online training phase 840, and an online evaluation and continuous improvement phase 860. During the offline training phase 820, the device control engine 610 may receive simulated data 822 from a simulated DPS 825, and may generate control actions 617. The simulated DPS 825 may also generate a simulated reward function in response to those control actions 617, and may provide the simulated reward function to the device control engine 610, which may use it to update its synaptic weights as described above. This offline training phase 820 may continue until the device control engine 610 reaches a first predetermined accuracy level.

Next, the partially trained device control engine 610 may be transferred to an online environment to begin the online training phase 840. This online training phase 840 is similar to the offline training phase 820 except one or more real DPSs 100 operating in an online environment may be used in place of the simulated DPS 825. That is, the offline training phase 820 in some embodiments produces a stable and effective control policy. So, the online training phase 840 may be used to fine-tune that control policy. Advantageously, this fine-tuning may only require a small amount of data from the online environment. The offline training phase 820 may continue until the device control engine 610 reaches a second predetermined accuracy level.

Next, the fully trained device control engine 610 may be transferred to a production environment and used for production workloads. In addition, an online evaluation and continuous improvement phase 860 may begin. During this third phase 860, the device control engine 610 directly controls one or more real DPS 100 in the online environment and is used for production workloads. The performance of the device control engine 610 may continue to be periodically monitored and/or fine-tuned to adapt to changing usage patterns and environmental conditions.

Figure 9:
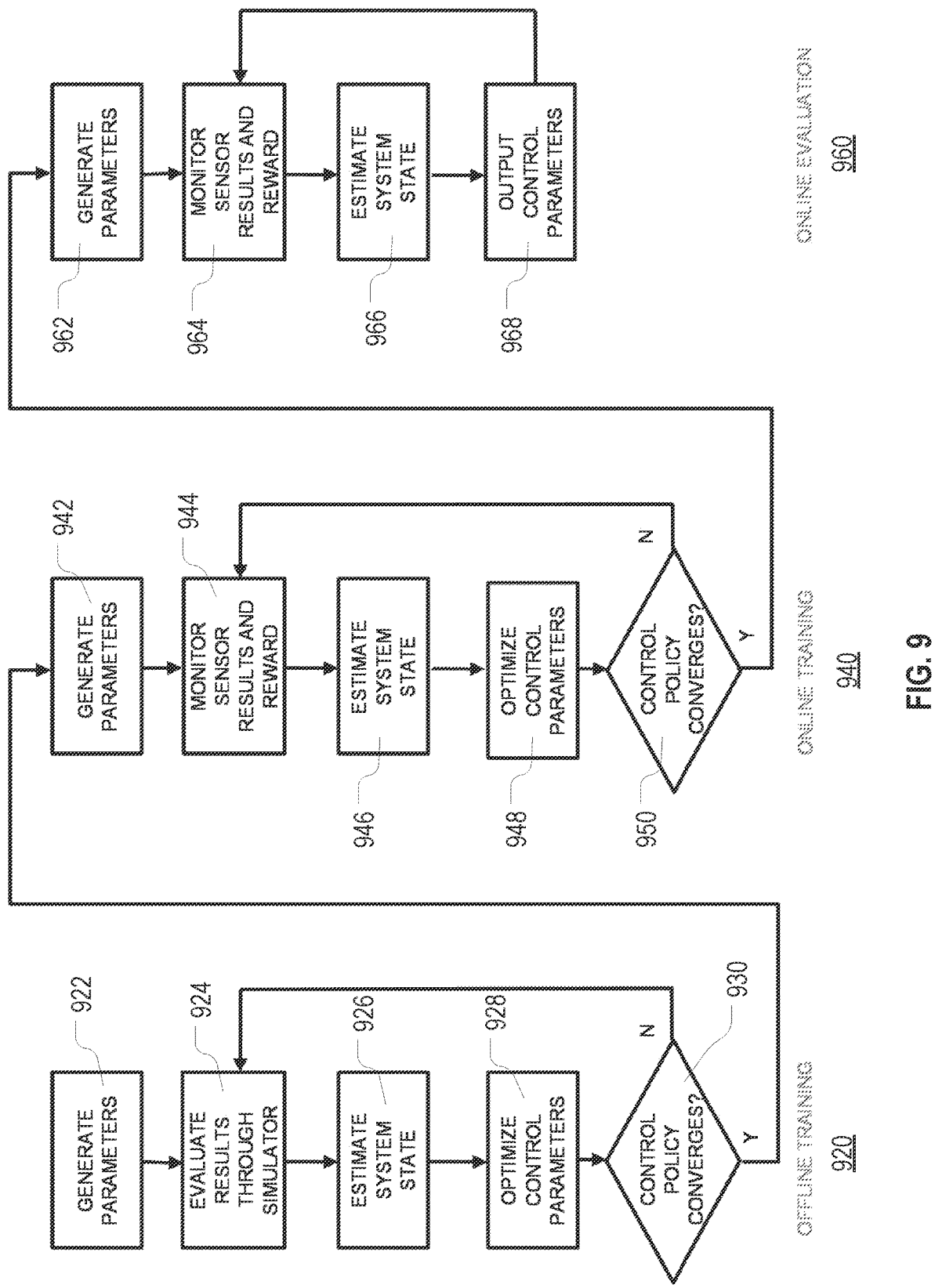
FIG. 9 is a low level flow chart illustrating one method of operating a device control engine, consistent with some embodiments.

FIG. 9 is a low-level flow chart illustrating one method 900 of operating a device control engine 610, consistent with some embodiments. Method 900 may again comprise three phases: an offline training phase 920, an online training phase 940, and an online evaluation and continuous improvement phase 960. At operation 922, the control parameter generator 615 may generate an initial set of settings 617. These settings may be evaluated through the simulator 825 at operation 924 to generate a simulated reaction by the DPS 100. Next, at operation 926, the simulated sensor readings may be evaluated by the system state estimator 625. The resulting vector may be used by control optimization 620 at operation 926 to generate optimized control parameters 616. These parameters may be provided to the control parameter generator 615 and then to the simulator 825. If the control parameters 616 converge (e.g., generally match) the simulated state, then operation proceeds to the online training phase 940. Otherwise, the new simulated parameters are provided to the system state estimator 625 and the method returns to operation 926.

At operations 942-950, flow generally proceeds as described above except that a live DPS 100 operating in a test environment is used instead of the simulator 825. More specifically, at operation 942, the control parameter generator 615 may generate an initial set of settings 617. These settings may be given to the DPS 100 at operation 924. Next, at operation 926, the resulting sensor readings from the DPS 100 may be evaluated by the system state estimator 625. The resulting state information 626 (e.g., vector) may be used by control optimization 620 at operation 948 to generate optimized control parameters 616. These parameters may be provided to the control parameter generator 615 and then to the DPS 100. If the control parameters 616 converge (e.g., generally match) the state of the DPS 100, then operation proceeds to a production phase 960. Otherwise, the new simulated parameters are provided to the system state estimator 625 and the method returns to operation 946.

At operations 942-950, flow generally proceeds as described above except that a live DPS 100 operating in a production environment is used. More specifically, at operation 962, the control parameter generator 615 may generate an initial set of settings 617. These settings may be given to the DPS 100 at operation 924. Next, at operation 926, the resulting sensor readings from the DPS 100 may be evaluated by the system state estimator 625. The resulting vector 626 may be used by control optimization 620 at operation 948 to generate optimized control parameters 616. These parameters may be provided to the control parameter generator 615 and then to the DPS 100 at operation 968. Loop 964-968 may continue indefinitely.

Computer Program Product

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a subsystem, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

General

The descriptions of the various embodiments of the present disclosure have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

Therefore, it is desired that the embodiments described herein be considered in all respects as illustrative, not restrictive, and that reference be made to the appended claims for determining the scope of the invention.

What is claimed is:

1. A system for optimizing performance of a functional circuit unit, the system including:
    a functional circuit unit having an associated cooling device and power converter;
    one or more sensors for the functional circuit unit, the one or more sensors including a power sensor and a temperature sensor;
    a first machine learning model (MLM) adapted to:
        receive temperature data and power data from the one or more sensors; and
        generate control signals for the cooling device and the power converter to optimize performance of the functional circuit unit; and
    a second MLM adapted to:
        predict a state representation of the functional circuit unit based at least in part on the temperature data and power data;
        generate a vector that captures the predicted state representation; and
        recognize temporal dependencies in the temperature data and power data.

2. The system of claim 1, wherein the functional circuit unit comprises an electronic card of a server.

3. The system of claim 1, wherein the functional circuit unit is chosen from the group consisting of a microprocessor, a graphical processing unit, and a machine learning accelerator.

4. The system of claim 1, wherein the temperature data and power data further include performance signals associated with the functional circuit unit.

5. The system of claim 1, wherein the first machine learning model is trained at least in part on simulated performance and temperature and power data using reinforcement learning techniques.

6. The system of claim 1, further comprising a control parameter generator operably connected to the first machine learning model and adapted to generate control actions for the associated cooling device and power converter from the control signals.

7. The system of claim 1, wherein the power sensor comprises a partial state sensor adapted to measures a power consumption of only functional circuit unit.

8. The system of claim 1, further comprising a plurality of temperature sensors that measures temperatures at a plurality of various locations associated with the functional circuit unit.

9. A method of optimizing performance of a functional circuit unit, comprising:
    generating, by one or more sensors associated with a functional circuit unit having an associated cooling device and power converter, temperature data and power data;
    by a first machine learning model (MLM):
        generating control signals for the cooling device and the power converter to optimize performance of the functional circuit unit; and
    by a second MLM:
        predicting a state representation of the functional circuit unit based at least in part on the temperature data and power data;
        generating a vector that captures the predicted state representation; and
        recognizing temporal dependencies in the temperature data and power data.

10. The method of claim 9, further comprising:
    partially training the first machine learning model using simulated data in a simulated environment; and
    transferring the first machine learning model to an online environment; and
    additionally training the first machine in the online environment.

11. The method of claim 9, further comprising generating, by a control parameter generator from the control signals, control actions for the associated cooling device and power converter.

12. A computer program product for optimizing performance of a functional circuit unit, the computer program product comprising a computer readable storage medium having program instructions embodied therewith, the program instructions executable by a computer to perform a method comprising:
    generating, by one or more sensors associated with a functional circuit unit having an associated cooling device and power converter, temperature data and power data;
    by a first machine learning model (MLM):
        generating control signals for the cooling device and the power converter to optimize performance of the functional circuit unit; and
    by a second MLM:
        predicting a state representation of the functional circuit unit based at least in part on the temperature data and power data;
        generating a vector that captures the predicted state representation; and
        recognizing temporal dependencies in the temperature data and power data.

13. The computer program product of claim 12, wherein the method further comprises:
    partially training the first machine learning model using simulated data in a simulated environment; and
    transferring the first machine learning model to an online environment; and additionally training the first machine in the online environment.

14. The computer program product of claim 12, wherein the method further comprises generating, by a control parameter generator from the control signals, control actions for the associated cooling device and power converter.

* * * * *